United States Patent [19]

Dawes et al.

[11] 4,008,352
[45] Feb. 15, 1977

[54] HEAT LAMINATION OF THERMOPLASTIC FILMS

[75] Inventors: David Haddon Dawes, Westbrook; Kashmiri Lal Gupta, Kingston, both of Canada

[73] Assignee: Du Pont of Canada Limited, Montreal, Canada

[22] Filed: Jan. 24, 1975

[21] Appl. No.: 543,924

[30] Foreign Application Priority Data

Apr. 30, 1974 Canada .............................. 198499

[52] U.S. Cl. .......................... 428/474; 156/306; 156/311; 156/272; 428/483; 428/500; 428/518

[51] Int. Cl.² .................. B32B 31/28; B32B 27/34; B32B 27/32; B32B 27/36

[58] Field of Search .................. 156/306, 272, 311; 428/474, 480, 483, 500, 518

[56] References Cited

UNITED STATES PATENTS

| | | | |
|---|---|---|---|
| 2,768,905 | 10/1956 | Massey | 156/306 X |
| 2,838,437 | 6/1958 | Busse et al. | 156/306 |
| 3,018,189 | 1/1962 | Traver | 156/272 X |
| 3,222,210 | 12/1965 | Hammond | 428/474 |
| 3,297,518 | 1/1967 | Maschner | 428/474 X |
| 3,360,412 | 12/1967 | James | 156/229 |
| 3,370,972 | 2/1968 | Nagel et al. | 428/474 X |
| 3,503,777 | 3/1970 | Kappas et al. | 428/500 X |
| 3,505,156 | 4/1970 | Handscomb et al. | 428/500 X |
| 3,505,269 | 4/1970 | Jeffery et al. | 428/500 X |
| 3,575,793 | 4/1971 | Paisley | 156/306 X |
| 3,901,755 | 8/1975 | Martin et al. | 428/474 X |
| 3,912,843 | 10/1975 | Brazier | 428/474 |
| 3,950,206 | 4/1976 | Adachi et al. | 428/474 |

FOREIGN PATENTS OR APPLICATIONS

| | | |
|---|---|---|
| 733,471 | 5/1966 | Canada |
| 900,559 | 7/1962 | United Kingdom |

*Primary Examiner*—Harold Ansher

[57] ABSTRACT

A process for the heat lamination of a first film of polyethylene, polyamide, polyester, and such films coated with polyvinylidene chloride, to a second film of polyethylene, ionomer, and such films coated with polyvinylidene chloride. The surface of the first and second films has been treated with a corona discharge prior to heat lamination, and preferably the second film has an adhesion promoter on its surface. The process has the steps of (a) bringing the first and second films into contact, (b) contacting the combined films with a roll heated to a temperature greater than that required to produce low peel strength but less than that at which the laminate adheres to it, (c) passing the laminate through a heated zone to increase the peel strength, and (d) cooling the laminate.

17 Claims, 1 Drawing Figure

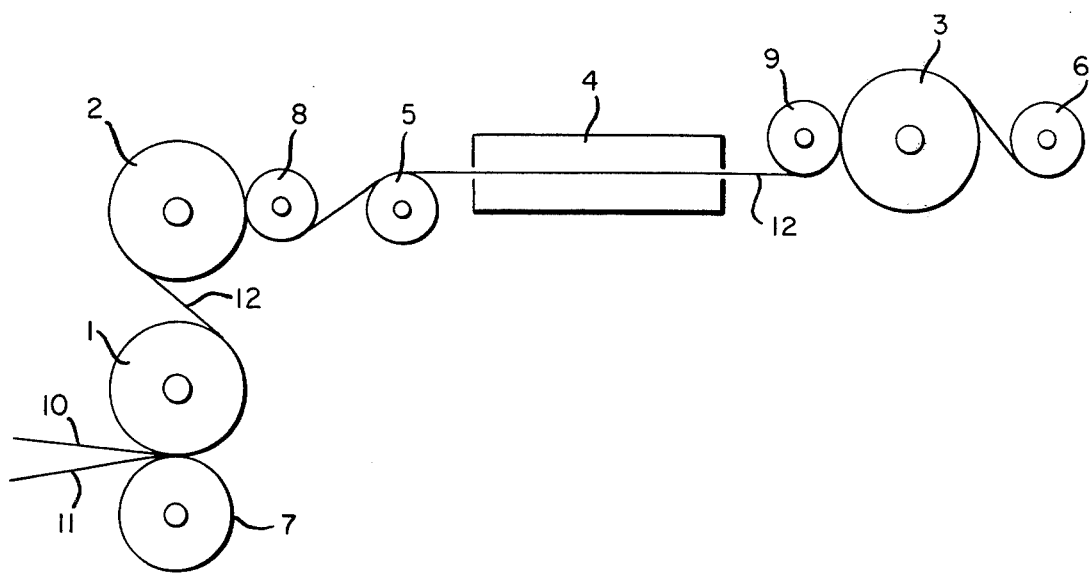

HEAT LAMINATION OF THERMOPLASTIC FILMS

BACKGROUND OF THE INVENTION

The present invention relates to a process for the lamination of thermoplastic films and, in particular, to the lamination of thermoplastic films by a heat lamination process.

Thermoplastic films are used in a wide variety of end uses and, in particular, are used extensively in the packaging industry. However, for some end uses, individual thermoplastic films may have deficiencies in one or more properties, for example, in permeability, processability, and/or heat sealability of the film. These deficiencies may frequently be overcome by the application of coatings to the film or by the lamination of two or more films. Techniques for the manufacture of laminates are known, for example, the use of adhesives, co-extrusion, melt coating, and heat lamination under the influence of pressure. These techniques may require, for example, the use of expensive apparatus, the use of solvents, with the resultant fire, toxicity, and/or pollution hazards, and/or may be inefficient for the production of a range of laminates on one apparatus. There is, at the present time, increasing concern over the effects of solvents retained in packaging films, especially laminates manufactured by techniques requiring the use of solvents, and over the effects of solvents released to the atmosphere as the result of the use of such techniques. Techniques for the manufacture of laminates in the absence of solvents are therefor of increasing interest.

Relatively low-melting polymer films, for example, films of homopolymers of ethylene and copolymers of ethylene and butene-1, are frequently laminated to other thermoplastic films to enhance the heat sealability of these thermoplastic films. Laminates made with such low-melting films on an outer surface may be difficult to manufacture, in the absence of adhesives and/or solvents, on apparatus capable of being used economically for the manufacture of a wide range of laminates. In particular, it may be difficult to manufacture laminates having peel strengths of commercially acceptable levels between the films of the laminate on such apparatus.

As stated hereinabove, techniques for the heat lamination of films are known. A technique for the lamination of a polyolefin film to a substrate web, for example, paper, foil, regenerated cellulose film, and saran-coated regenerated cellulose film is described by A. L. James in U.S. Pat. No. 3,360,412, which issued on Dec. 26, 1967. The technique described by James is capable of improvement, especially for the lamination of two thermoplastic films, and, in particular, for the lamination of two thermoplastic films of similar softening or melting points and in the lamination of thermoplastic films in which a film of relatively low softening point comes in contact with a heated roll. The laminates formed by such a technique may not have peel strengths of commercially acceptable levels.

SUMMARY OF THE INVENTION

An improved process for the lamination of, in particular, a relatively low-melting thermoplastic polymer film to another thermoplastic film, or for the lamination of two thermoplastic films made from polymers of similar melting points, has now been found.

Accordingly, the present invention provides a process for the manufacture of a laminate of thermoplastic films in which at least one surface of a first film selected from the group of polyethylene, polyamide, and polyester, and such films coated with polyvinylidene chloride is laminated to a surface of a second film selected from the group of polyethylene and ionomer, and such films coated with polyvinylidene chloride, at least the surfaces of said thermoplastic films that are laminated having been treated with a corona discharge, said process comprising the steps of:

a. bringing the corona discharge-treated surface of the first film into face-to-face contact with the corona discharge-treated surface of the second film, b. contacting the resulting combination of films with at least one roll heated to a temperature greater than the temperature required to form a laminate having low peel strength but less than the temperature at which the laminate adheres to the heated roll, c. increasing the peel strength of the laminate by passing the laminate through a heated zone, said heated zone being at a temperature at least as high as that of the heated roll, and d. cooling the laminate so formed.

In a preferred embodiment of the process of the present invention, the laminate is unsupported in the heated zone.

In a further preferred embodiment, the temperature of the heated zone is greater than that of the heated roll.

In another embodiment, the heated zone is an oven.

In a further embodiment, the laminate is cooled by contacting the laminate with a cool roll, especially a water-cooled roll.

In a still further embodiment, at least one of the thermoplastic films is a coated film or a laminate.

In yet another embodiment, at least one of the thermoplastic films is a polyethylene film, preferably a film of polyethylene containing an adhesion promoter.

The present invention also provides a laminate of peel strength of at least 300 gm./inch, said laminate having been manufactured from thermoplastic films, in which at least one surface of a first film selected from the group of polyethylene, polyamide, and polyester, and such films coated with polyvinylidene chloride, is laminated to a surface of a second film containing an adhesion promoter and selected from the group consisting of polyethylene and ionomer, and such films coated with polyvinylidene chloride, at least the surface of said thermoplastic films that are laminated having been treated with a corona discharge, in a process comprising the steps of:

a. bringing the corona discharge-treated surface of the first film into face-to-face contact with the corona discharge-treated surface of the second film and contacting the resulting combination of films with at lease one roll heated to a temperature greater than the temperature required to form a laminate having low peel strength but less than the temperature at which the laminate adheres to the heated roll, b. increasing the peel strength of the laminate to at least 300 gm./inch by passing the laminate through a heated zone, said heated zone being at a temperature at least as high as that of the heated roll, and c. cooling the laminate so formed.

The term "low peel strength" has been used hereinabove to describe the bond formed between adjacent films of the laminate on contact of the combination of films with the heated roll(s). The peel strength of a laminate may be measured by the method of ASTM D-1876. The term "low peel strength" is defined as being less than the strength required for a commercially acceptable laminate but sufficient to prevent separation of the films of the laminate as the laminate is passed from the heated roll to the heated zone. Such peel strengths include those known in the trade as "tack seals."

BRIEF DESCRIPTION OF THE DRAWING

The drawing is a schematic representation of equipment used in one embodiment of the process.

DESCRIPTION OF THE PREFERRED EMBODIMENTS

The apparatus shown in the drawing comprises two heated rolls 1 and 2, cooled roll 3, an oven 4, guide rolls 5 and 6, nip rolls 7 and 9, and stripper roll 8. The two films to be laminated, designated 10 and 11, are aligned and fed to heated roll 1. Films 10 and 11 contact each other and heated roll 1 at nip roll 7. The resulting combination of films, designated 12, is passed partially around heated roll 1, contact between the combination of films 12 and heated roll 1 being maintained for about one-half of a revolution of the heated roll 1. The combination of films 12 is then passed to the second heated roll 2. Contact with heated roll 2 is maintained for approximately one-half of a revolution of heated roll 2. The film 12 is removed from heated roll 2 at stripper roll 8, passed partially around guide roll 5 and through oven 4. After exiting oven 4, the film 12 is passed between nip roll 9 and cool roll 3 and then partially around cool roll 3. The thus cooled film is then passed partially around guide roll 6 to, for example a film slitter and a wind-up (not shown), or to further steps in an integrated process.

In an embodiment of the process of the present invention, a film selected from the group consisting of polyethylene and ionomer films is laminated to each side of a film selected from the group consisting of polyethylene, polyamide and polyester films.

The properties of the films of the laminate are important in determining the temperature at which the heated rolls may be operated. For example, the temperature at which a low peel strength bond may be formed between films 10 and 11 in the film combination, and the temperatures at which films 10 and 11 adhere, block, or stick, herein referred to as "adhere," to the heated rolls 1 and 2 are important. Adherence of films 10 and 11 to the heated rolls may cause process problems, for example, the marring of the film surface and/or a tendency for the laminate of low peel strength to remain in contact with the heated rolls at the points of the rotation of the heated rolls where the laminate should come out of contact with the heated rolls. The heated rolls are operated at a temperature above the temperature at which a low peel strength bond is formed but below the temperature at which the film adheres to the heated roll. If films 10 and 11 are different, it may be possible or preferable to operate the two heated rolls 1 and 2 at different temperatures, for example, if the polymer of one film is higher melting than the polymer of the other film, the heated roll that the film of the higher melting polymer contacts may be operated at a higher temperature. If the heated rolls are coated, for example, with a TEFLON fluorocarbon polymer coating, it may be possible to operate the heated rolls at temperatures higher than those possible for uncoated rolls. The maximum temperatures at which the heated rolls may be operated without the films adhering to the heated rolls will also depend on the residence time of the film on the heated rolls. The speed at which the process is operated is therefore an important variable in determining the maximum operating temperature of the rolls. As an example of suitable operating temperatures in the manufacture of a laminate, if one film, film 10, is a low-density (0.920) ethylene/butene-1 copolymer film, the operating temperature of heated roll 1 may be in the range 110°–130° C. at operating speeds of 50 to 200 feet per minute. If the other film, film 11, is a polyamide film, roll 2 may be operated at a temperature in the range 120°–170° C. With some film combinations, it may be possible to obtain the desired low peel strength by operating the process with only one heated roll.

The heating zone, described as an oven 4 in the embodiment shown in the drawing, is preferably operated at a temperature higher than that of the heated rolls 1 and 2. The laminate of low peel strength formed on the heated rolls 1 and 2 is preferably passed through the oven while in an unsupported condition. The temperature of the oven is such that the peel strength of the laminate is preferably increased to at least 300 gm./inch, especially to at least 450 gm./inch, and, in particular, to a peel strength greater than the strength of the weakest film in the laminate. The properties of the films of the laminate are important factors in determining the operating temperature of the heating zone. For example, if the films of the laminate are all low-melting films, it may be necessary to maintain the operating temperature of the oven significantly lower than the temperature that may be used when one of the films is of relatively high melting point. While the heating zone has been described in terms of an oven, other heating zones are known, for example, infrared heating zones and microwave heating zones.

As described in the embodiment hereinabove, the laminate is cooled by contacting the laminate with a cooled roll. Preferably, the cooled roll is a water-cooled roll. However, other cooling techniques are known, for example, the use of air blown onto the film. The laminate is cooled sufficienty to enable the laminate to be wound up or passed to apparatus for the further processing of the film, for example, a packaging machine.

The surface of the films brought into contact with each other at heated roll 1 must have been previously treated with a corona discharge. Such treatment may be carried out either out-of-line or, preferably, in-line with the process of the present invention. Techniques for the corona discharge treatment of films are known.

With some combinations of films, it may be preferable to incorporate an adhesion promoter, for example, fumaric acid, into one or more films of the laminate, in addition to treating the films with a corona discharge. The adhesion promoter is preferably incorporated into the polyethylene or ionomer film. If fumaric acid is incorporated into a polyethylene film to improve its adhesion to a polyhexamethylene adipamide film, it is preferred that the polyethylene film contain in the range of from 25 ppm to 200 ppm of fumaric acid.

The process of the present invention may be operated with films obtained from a wide range of polymers. The polymers must, of course, be capable of being fabricated in the form of film or of being coated onto a film. As stated hereinabove, at least one of the films is a film of low-melting polymer, for example, a film of polyethylene or an ionomer polymer. The laminates produced by the process of the invention may be two-layer or multilayer laminates and, in some instances, multilayer laminates may be obtained by feeding more than two films to the process or by using the laminate as one of the films fed to the hot rolls. The possibility of manufacturing multilayer laminates by feeding more than two films to the process will, of course, depend on the particular combination of the laminate.

The process of the present invention may be operated with films of, for example, homopolymers and copolymers of ethylene, especially copolymers of ethylene and butene-1, ionomer polymers, for example SURLYN, polyamides, especially polyhexamethylene adipamide, polyesters, and films of such polymers coated with, for example, polyvinylidene chloride polymers, and regenerated cellulose films coated with polyvinylidene chloride polymers. Preferred combinations of films are illustrated in the examples hereinafter.

The present invention is illustrated by the following examples.

EXAMPLE 1

A. Two parts of an ethylene/butene-1 copolymer of density 0.9195, melt index 1.4, and containing 750 ppm of fumaric acid were blended with 13 parts of an ethylene/butene-1 copolymer of density 0.9195 and melt index 1.4. The resin was extruded onto 0.05 mm. (2 mil) film usng a blown film process. One side of the film was subjected to corona discharge treatment, immediately after extrusion, at a treatment intensity of 1.0 watt/inch/feet per minute. Analysis indicated that the film contained 50 ppm of fumaric acid and that the surface energy of the corona discharge-treated surface of the film was 52 dynes/cm.

A 0.75-mil polyhexamethylene adipamide film was extruded and treated with a corona discharge at a treatment intensity of 0.29 watt/inch/feet per minute.

Using the process hereinbefore described and illustrated in the drawing, the corona-treated faces of the two films were brought into contact with each other at a first hot roll 1 by means of a nip roll 7, the ethylene/butene-1 copolymer film contacting the hot roll 1, passed approximately half way around the first hot roll 1 and similarly around a second hot roll 2, the polyhexamethylene adipamide film contacting the hot roll 2, passed through an oven 4 in an unsupported condition, contacted with a cold roll 3, and passed to a wind-up. Details of the process conditions were as follows:

| | |
|---|---|
| Film speed | 200 fpm |
| Pressure at nip roll 7 | 75 lb./inch width of nip |
| Hot roll temperatures | |
| first roll | 125° C. |
| second roll | 132° C. |
| Oven temperature | 232° C. |
| Oven length (feet) | 12 |
| Cold roll temperature | 21° C. |

The laminate formed had a peel strength of 100–200 gm./inch before entering the oven and 1200–1300 gm./inch at the wind-up.

B. The procedure described in Part A was repeated except that no fumaric acid was incorporated into the ethylene/butene-1 copolymer film. The laminate formed had a peel strength of 100–260 gm./inch at the wind-up.

C. The procedure described in Part A was repeated except that neither side of the film of ethylene/butene-1 copolymer was corona discharge treated. The laminate formed had a peel strength of 10–20 gm./inch at the wind-up.

The Table below compares the results of this example and illustrates the effect of fumaric acid in the ethylene/butene-1 copolymer film and/or the corona discharge treatment of the mating surfaces of the films being joined. In each example, the film line speed was the same, i.e., 200 ft./min.

TABLE

| | | Ethylene/Butene-1 Copolymer Film | | |
|---|---|---|---|---|
| Example | Nylon Film Corona Treated | Corona Treated | Contains Fumaric Acid | Bond Strength (gm./inch) |
| 1-A | Yes | Yes | Yes | 1200–1300 |
| 1-B | Yes | Yes | No | 100–260 |
| 1-C | Yes | No | Yes | 10–20 |

EXAMPLE 2

Du Pont's SURLYN ionomer polymer was blended with fumaric acid and extruded as 2-mil film using a conventional blown film process. One surface of the film was treated with a corona discharge immediately after extrusion at a treatment intensity of 1.0 watt/inch/feet per minute. The film contained 100 ppm of fumaric acid and the corona discharge-treated surface had a surface energy of 52 dynes/cm.

Using the process described in Example 1-A, the ionomer film was laminated to the polyhexamethylene adipamide film of Example 1. The ionomer film contacted the first hot roll 1. The process conditions were as follows:

| | |
|---|---|
| Film speed | 50 fpm |
| Pressure at nip roll 7 | 75 lb./inch width of nip |
| Hot roll temperatures | |
| first roll | 93° C. |
| second roll | 121° C. |
| Oven temperature | 199° C. |
| Cold roll temperature | 21° C. |

The laminate formed had a peel strength of 1200–1600 gm./inch at the wind-up.

EXAMPLE 3

To illustrate the effect of process variables, the process described in Example 1-A was repeated using different process conditions. In all cases, the nip roll pressure was 75 psi and the cold roll temperature was 21° C. The other process conditions used and the results obtained were as follows:

| Run | Hot Roll Temperatures (° C.) First | Second | Oven Temperature (° C.) | Film Speed (fpm) | Laminate[1] Peel Strength (gm./inch) |
|---|---|---|---|---|---|
| 1 | 66 | 66 | 232 | 50 | 1120 |
| 2 | 66 | 66 | 232 | 200 | 200 |
| 3 | 110 | 110 | 177 | 50 | 1600 |
| 4 | 121 | 127 | 177 | 200 | 400 |
| 5 | 121 | 127 | ambient | 200 | 150 |
| 6 | 127 | 132 | 232 | 200 | 1400 |

-continued

| Run | Hot Roll Temperatures (° C.) First | Hot Roll Temperatures (° C.) Second | Oven Temperature (° C.) | Film Speed (fpm) | Laminate[1] Peel Strength (gm./inch) |
| --- | --- | --- | --- | --- | --- |
| 7 | 121 | 132 | 232 | 200 | 1300 |
| 8 | 121 | 132 | 232 | 200 | 620 |

[1]All samples of ethylene/butene-1 copolymer film contained 50 ppm of fumaric acid after extrusion except for run 8 where the concentration of fumaric acid was 25 ppm.

EXAMPLE 4

One part of an ethylene/butene-1 copolymer of density 0.9185, melt index 0.7, and containing 2000 ppm of fumaric acid was blended with 24 parts of an ethylene/butene-1 copolymer of density 0.9185, melt index 0.7. The resin was extruded into 2-mil film using a blown film process. One side of the film was subjected to corona discharge treatment, immediately after extrusion, at a treatment intensity of 1.0 watt/inch/feet per minute. Analysis of the film indicated a fumaric acid content of 61 ppm.

A 0.75-mil polyhexamethylene adipamide film was extruded and treated on both sides with corona discharge at a treatment intensity of 0.29 watt/inch/feet per minute.

Using the process hereinbefore described and indicated in the drawing, the polyhexamethylene adipamide film was nipped between two films of the ethylene/butene-1 copolymer, the corona discharge-treated faces of the ethylene/butene-1 copolymer films containing the polyhexamethylene adipamide film, at first hot roll 1 by means of nip roll 7. The combined films were then passed approximately half way around the first hot roll 1 and similarly around a second hot roll 2, passed in an unsupported condition through an oven 4, contacted with a cold roll 3, and passed to a wind-up. Details of the process conditions were as follows:

| | |
| --- | --- |
| Film speed | 200 fpm |
| Pressure at nip roll 7 | 200 lb./inch width of nip |
| Hot roll temperatures | |
| first roll | 121° C. |
| second roll | 145° C. |
| Oven temperature | 305° C. |
| Oven length (feet) | 12 |
| Cold roll temperature | 21° C. |

The laminate formed had a peel strength of 900–1100 gm./inch at wind up.

EXAMPLE 5

One part of an ethylene/butene-1 copolymer of density 0.9195, melt index 1.4, and containing 2000 ppm of fumaric acid was blended with 24 parts of an ethylene/butene-1 copolymer of density 0.9195, melt index 1.4. The resin was extruded into 2-mil film using a blown film process. One side of the film was subjected to corona discharge treatment, immediately after extrusion, at a treatment intensity of 1.0 watt/inch/feet per minute. Analysis of the film indicated a fumaric acid content of 50 ppm.

A 0.75-mil polyhexamethylene adipamide film was extruded and coated on one side with a polyvinylidene chloride coating. The coated side of the film was treated, immediately before being bonded in a laminate, with corona discharge treatment, at a treatment intensity of 0.68 watt/inch/feet per minute.

Using the process of Example 1-A, the corona discharge-treated surface of the ethylene/butene-1 copolymer film was brought into contact with the corona discharge-treated polyvinylidene chloride coating on the polyhexamethylene adipamide film. Details of the process conditions were as follows:

| | |
| --- | --- |
| Film speed | 50 fpm |
| Pressure at nip roll 7 | 90 lb/inch width of nip |
| Hot roll temperatures | |
| first roll | 110° C. |
| second roll | 110° C. |
| Oven temperature | 177° C. |
| Cold roll temperature | 21° C. |

The laminate formed had a peel strength of 1200–1400 gm./inch at wind-up.

EXAMPLE 6

The procedure described in Example 5 was repeated except that:
1. the film speed was 200 fpm,
2. the first hot roll temperature was 130° C.,
3. the second hot roll temperature was 143° C., and
4. the oven temperature was 260° C.

The laminate formed had a peel strength of 600–800 gm./inch at wind-up.

We claim:

1. A process for the manufacture of a thermoplastic film laminate wherein at least one surface of a thermoplastic first film selected from the group of polyethylene, polyamide, and polyester is laminated to a surface of a thermoplastic second film of polyethylene, at least the surfaces of said first and second films that are laminated having been treated with a corona discharge, said first and second films having similar melting points and at least one of said films is a film of low-melting polymer, said process comprising the steps of:
   a. bringing the corona discharge-treated surface of the first film into face-to-face contact with the corona discharge-treated surface of the second film,
   b. contacting the resulting combination of films with at least one roll heated to a temperature greater than the temperature required to form a laminate having low peel strength but less than the temperature at which the laminate adheres to the heated roll,
   c. increasing the peel strength of the laminate by passing the laminate through a heated zone, said heated zone being at a temperature at least as high as that of the heated roll, and
   d. cooling the laminate so formed.

2. The process of claim 1 in which the laminate is in an unsupported condition in the heated zone.

3. The process of claim 2 in which there are two heated rolls, one contacting each side of the combination of films.

4. The process of claim 3 in which the temperature of the heated zone is greater than the temperature of the heated rolls.

5. The process of claim 4 in which the heated zone is an oven.

6. The process of claim 5 in which the laminate is cooled by contacting the laminate with a cooled roll.

7. The process of claim 6 in which the second film contains an adhesion promoter, said adhesion promoter being fumaric acid.

8. The process of claim 7 wherein the first film is a polyamide film.

9. The process of claim 7 wherein the first film is a polyamide film coated with polyvinylidene chloride.

10. The process of claim 3 in which each surface of the first film is laminated to a second film.

11. The process of claim 10 in which the heated zone is an oven, the laminate is cooled by contacting the laminate with a cooled roll, and the temperature of the oven is greater than the temperature of the heated rolls.

12. The process of claim 11 in which the second film contains an adhesion promoter, said adhesion promoter being fumaric acid.

13. The process of claim 12 in which the first film is a polyamide film and the second two films are polyethylene films.

14. A laminate of peel strength of at least 300 gm/inch, said laminate having been manufactured from thermoplastic films, in which at least one surface of a first film selected from the group consisting of polyethylene, polyamide, and polyester is laminated to a surface of a second film of polyethylene containing an adhesion promoter of fumaric acid, at least the surfaces of said first and second films that are laminated having been treated with a corona discharge, said first and second films having similar melting points and at least one of said films is a film of low-melting polymer, the process of manufacturing said laminate further comprising the steps of:

a. bringing the corona discharge-treated surface of the first film into face-to-face contact with the corona discharge-treated surface of the second film and contacting the resulting combination of films with at least one roll heated to a temperature greater than the temperature required to form a laminate having a low peel strength but less than the temperature at which the laminate adheres to the heated roll, b. increasing the peel strength of the laminate by passing the laminate through a heated zone, said heated zone being at a temperature at least as high as that of the heated roll, and c. cooling the laminate so formed.

15. The laminate of claim 14 wherein said first film is polyamide film.

16. The laminate of claim 15 wherein said first film is polyamide film coated with polyvinylidene chloride.

17. The laminate of claim 15 in which each surface of the polyamide film is laminated to a polyethylene film.

* * * * *